(No Model.)

C. R. SCHMIDT.
FLEXIBLE ELBOW FOR CONNECTING PIPES.

No. 561,441. Patented June 2, 1896.

Witnesses:

Charles R. Schmidt
Inventor:

UNITED STATES PATENT OFFICE.

CHARLES R. SCHMIDT, OF BALTIMORE, MARYLAND.

FLEXIBLE ELBOW FOR CONNECTING PIPES.

SPECIFICATION forming part of Letters Patent No. 561,441, dated June 2, 1896.

Application filed August 16, 1895. Serial No. 559,524. (No model.)

*To all whom it may concern:*

Be it known that I, CHARLES R. SCHMIDT, a citizen of the United States, residing at Baltimore, in the State of Maryland, have invented certain new and useful Improvements in Flexible Elbows for Connecting Pipes; and I do hereby declare the following to be a full, clear, and exact description of the invention, such as will enable others skilled in the art to which it appertains to make and use the same.

This invention has relation to flexible elbows or sockets for water-closet connections, and has for its object the provision of means for producing a tight joint between the bell-mouths of the elbow or socket and the metallic pipes which are coupled together by the elbow or socket, and has also for its object the provision of means for preventing the rubber from spreading at the ends and for permitting the joint to be tightened or loosened at will.

The invention consists in the novel structure and combination of parts, as hereinafter described and claimed.

Figure 1:
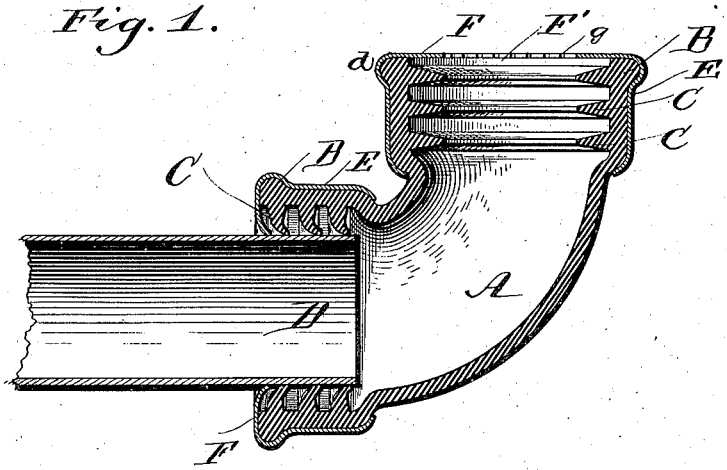
Figure 2:
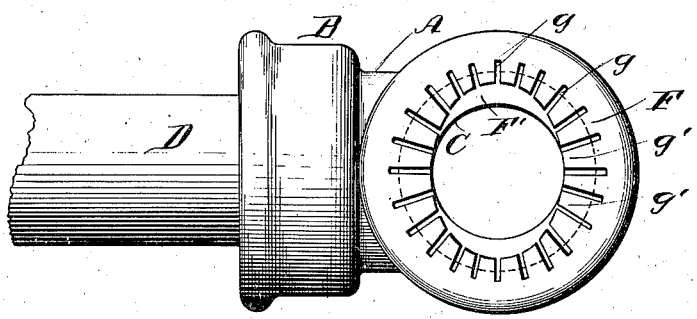

In the accompanying drawings, Figure 1 is a vertical central section of the flexible elbow embodying my invention and provided at the ends with the metallic casings or shields by which the form of the bell-mouths is preserved and lateral spreading prevented. Fig. 2 is a plan view of the same.

The elastic elbow A, embodying my invention, is of the usual size and general contour externally and is preferably made of soft rubber, but may be made of any other soft material capable of the same use. The ends of the elbow are formed with bell-mouths B B of larger diameter than the bore of the curved portion of the elbow and are molded with one or more internal annular flanges or ridges C, the edges of which extend beyond the internal wall of the elbow, forming or leaving openings of somewhat less diameter than the external diameter of the pipe D, which the elbow connects.

E E are metallic thimbles, ferrules, or rings, which are applied to the outside of the bell-mouths and are preferably made of spun or stamped metal, shaped to conform to the bell-mouths, and having the beads $d$ $d$ embracing the external flanges of the bell-mouths, as shown in the drawings. These rings or ferrules are formed each with an inwardly-extending flange F, having a central opening F', which is oval or elliptically formed with its minor axis about equal to the diameter of the flexible ridges formed on the interior of the bell-mouth. Radial kerfs or notches $g$ are cut in these flanges, producing a series of flexible tongues $g'$. This notched flange lies normally in the plane at right angles to the axis of the bell-mouth; but when a pipe is inserted in the bell-mouth such of the tongues as come in contact with the surface of the pipe are forced inward and obtain a grip or grasp upon the pipe, which aids in holding the pipe in position and prevents it from being accidentally displaced from the elbow. The central opening of this flange is made oval or elliptical, so as to accommodate pipes of different diameters, the tongues opening inwardly and accommodating themselves to different sizes of pipe without undue strain and the center opening tending under the action of the pipe to assume a circular form. When the pipe is inserted in one of the bell-mouths for the purpose of making a connection, the soft ridges or flanges on the interior of the bell-mouth are forced inwardly to accommodate the pipe, which is greater in diameter externally than the internal diameter of the flanges, and these flanges being slightly compressed are caused to tightly hug the pipe and form a perfectly water-tight joint. In inserting the pipe these flanges easily yield to the pressure and impact of the pipe, but resist any tendency of the pipe to be withdrawn or displaced lengthwise, as the friction between the pipe and flanges causes them to be drawn outwardly with the pipe and diminishes the diameter of their interior openings, so that the act of withdrawing the pipe or pressure exerted from within has the effect of tightening the flanges upon it and making the joint much tighter.

Having described my invention, what I claim as new, and desire to secure by Letters Patent, is—

1. A flexible connecting-elbow having an internal flanged substantially inexpansible bell end.

2. A flexible elbow or connection for connecting metallic pipes, having one or more internal annular flanges, and a rigid sustaining casing, or ferrule, at the end of the elbow, substantially as described.

3. A flexible elbow or connection for connecting metallic pipes, having an external sustaining ring or ferrule, with an internal notched flange, substantially as described.

4. A flexible connection or elbow for connecting metallic pipes, provided with a ring, having tongues which grip the pipe, substantially as described.

5. The combination with a pipe connection, having a flexible socket for the reception of the pipe of a metallic ring having flexible tongues, which clamp or grasp the pipe when the latter is inserted in the socket, substantially as described.

6. The combination with a pipe connection, of a metallic ring having an oval or elliptical opening, with flexible tongues to grasp the pipe when the latter is inserted in the connection, substantially as described.

In testimony whereof I affix my signature in presence of two witnesses.

CHARLES R. SCHMIDT.

Witnesses:
CHAS. H. SHIPLEY,
GEO. MCCAFFRAY.